Nov. 5, 1940.　　　A. J. ROSENBERGER　　　2,220,176
REGULATOR
Filed May 7, 1938　　　2 Sheets-Sheet 2

Inventor
Albert J. Rosenberger
by McConkey Dawson & Booth
Attorneys

Patented Nov. 5, 1940

2,220,176

UNITED STATES PATENT OFFICE 2,220,176

REGULATOR

Albert J. Rosenberger, Chicago, Ill., assignor to Republic Flow Meters Company, Chicago, Ill., a corporation of Illinois Application May 7, 1938, Serial No. 206,636

4 Claims. (Cl. 121—41)

This invention relates to regulators and more particularly to regulators of the type which will always assume a given position in response to a given controlling force.

One of the objects of the invention is to provide a regulator including a pivotally mounted cam moved about its pivot in accordance with the regulator setting and, in conjunction with the sensitive element of the regulator, operating, a regulator control element. Preferably the regulator includes a fluid motor moving a cam follower in a straight line in engagement with the pivoted cam to lap a control valve for the fluid motor.

Another object of the invention is to provide a novel cam which can easily be formed in any desired shape to vary the regulator characteristics.

Still another object is to provide a regulator including a pivotally mounted cam in which the cam can be adjusted to adjust the regulator characteristics.

Figure 1:
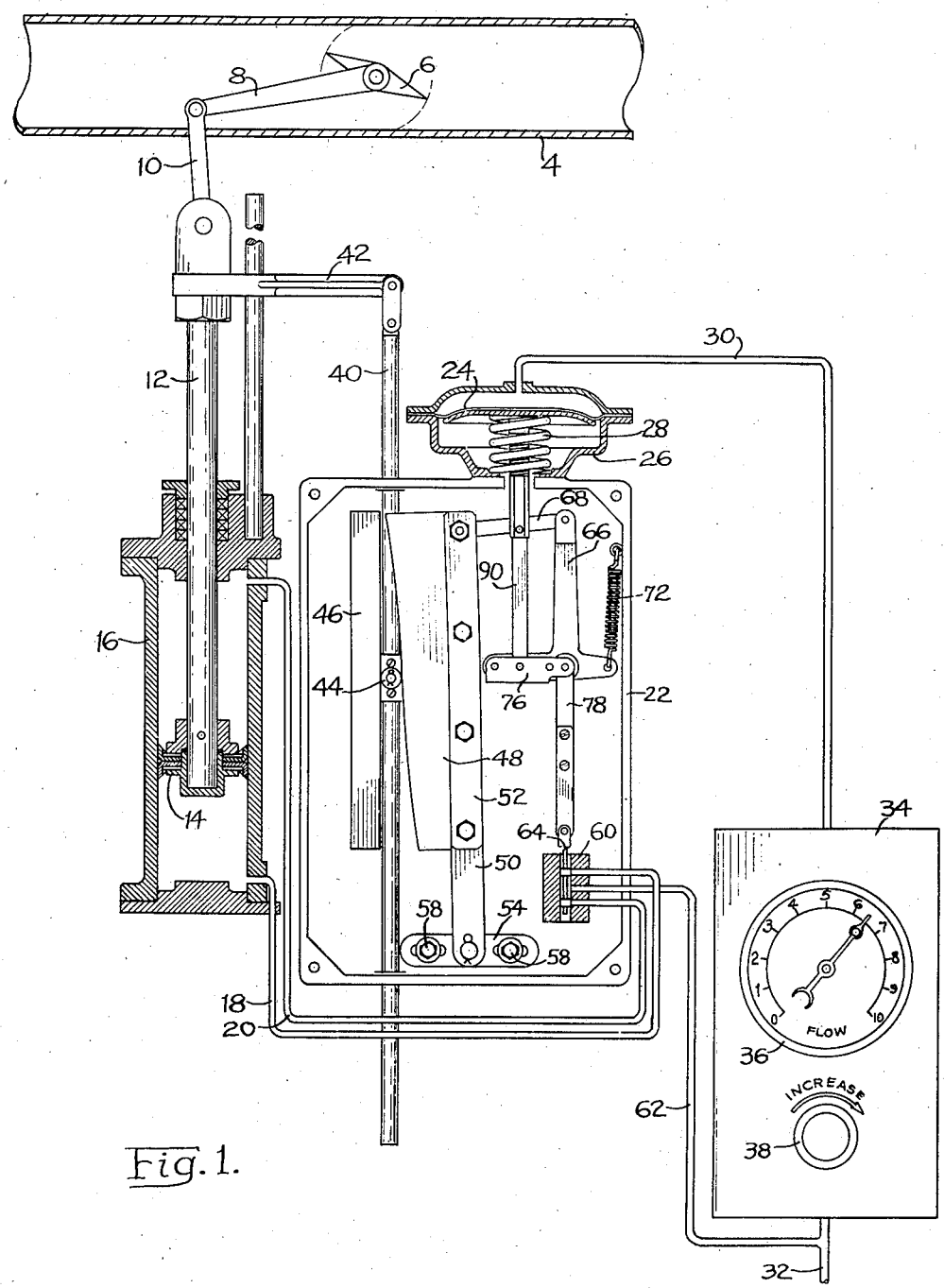
Figure 2:
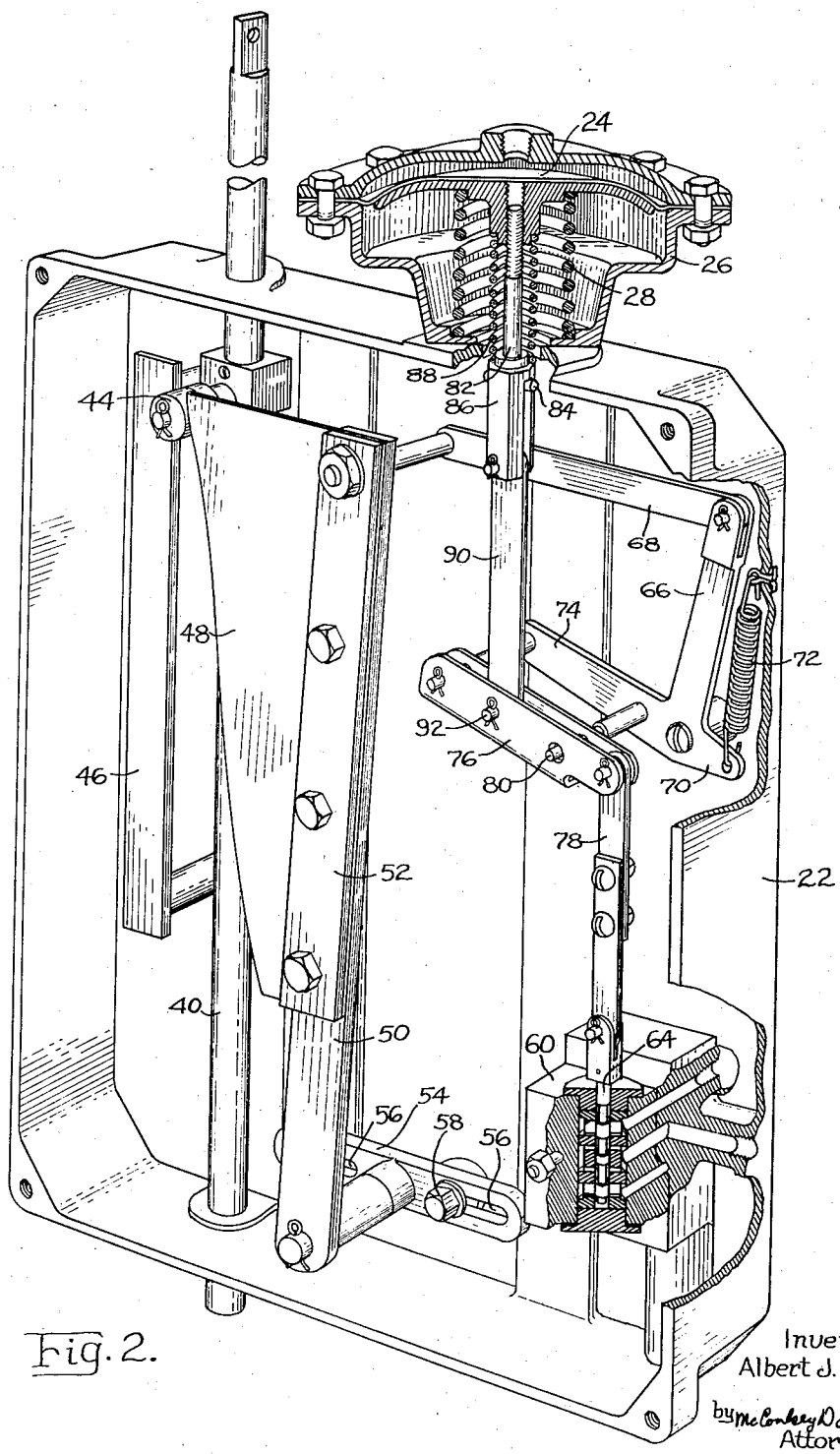

Other objects and advantages of the invention including novel subcombinations and desirable structural features will be apparent from the following description when read in connection with the accompanying drawings, in which:

Figure 1 is a diagrammatic view with parts in section of a regulator embodying the invention; and Figure 2 is a partial enlarged perspective view with parts in section.

The invention is illustrated as embodied in a regulator for controlling the rate of flow through a conduit 4 by means of a butterfly valve 6 having an actuating lever 8. A link 10 connects the lever 8 to the rod 12 of a piston 14 which is slidable in a stationary cylinder 16 having conduits 18 and 20 for supplying fluid to its opposite ends. The cylinder and piston form a reversible fluid motor for adjusting the valve 6 in accordance with variations in a controlling pressure as described hereinafter.

A casing 22 is mounted adjacent the cylinder 16 and carries a sensitive element shown as a flexible diaphragm 24 mounted in a split casing 26 on tap of the casing 22. A spring 28 urges the diaphragm upwardly while pressure admitted to the top of the diaphragm through a pipe 30 urges it downwardly and balances the spring pressure. The pipe 30 is connected to a source of supply of fluid under pressure through a pipe 32 and a controlling unit 34 by which the pressure acting on the diaphragm is controlled. The controlling unit is shown as including a dial 36 calibrated in terms of flow and a manual setting device 38 by which the pressure in pipe 30 may be controlled. It will be understood that the device 34 may, if desired, embody mechanism for regulating the pressure in pipe 30 in accordance with variations in the rate of flow through conduit 4 as is well known in the art to maintain the pressure on the diaphragm proportional to the desired rate of flow.

A rod 40 is slidably mounted in the casing 22 and is connected at its upper end to the piston rod 12 through a yoke 42. The rod 40 carries a cam follower or roller 44 which engages at one side a fixed guide 46 and at its other side engages the edge of a cam plate 48. As best seen in Figure 2, the cam plate 48 is formed of a relatively thin sheet of metal approximately $\frac{1}{16}$" in thickness which is secured along one edge to bar 50 by means of a strip 52. The bar 50 is pivoted at one end on a bracket 54 having a pair of elongated slots 56 through which screws 58 pass to secure the bracket to the casing. In this way the pivotal axis of the bar 50 can be adjusted toward and away from the rod 40 to change the characteristics of the cam.

Actuating fluid is supplied to the cylinder 16 through a valve 60 to which the pipes 18 and 20 are connected and which is supplied with fluid through a pipe 62 connected to the pipe 32. The valve includes a movable spool 64 which when raised connects pipe 18 to the pipe 62 and when lowered connects pipe 20 to pipe 62. In its neutral position the valve closes both pipes 18 and 20 as shown on the drawings.

The valve is operated jointly by the diaphragm 24 and the cam 48 through a differential linkage. As shown, this linkage comprises a three arm bell crank lever pivoted on the casing and having one of its arms 66 connected by a link 68 to the upper end of the bar 50. A second arm 70 of the bell crank lever is connected to a light spring 72 which is anchored to the casing 22 and serves to urge the cam 48 against the roller 44 with a relatively light pressure. The third arm 74 of the bell crank lever has pivoted on its free end a lever 76 which is connected at its free end to the spool 64 by a link 78. A stop pin 80 secured to the arm 74 extends through an enlarged opening in the lever 76 to limit relative movement of these two parts thereby to prevent overtravel of the valve.

The diaphragm 24 is connected to a rod 82 terminating in a pin 84 which is slidable in a slot in a cap member 86. A spring 88 urges the pin to one end of the slot as shown in Figure 2 to form a yielding connection between the diaphragm 24 and the cap 86. A link 90 connects the cap 86 to the center part of the lever 76 as shown at 92.

The parts are shown in the neutral position which they will occupy when the valve 6 is in a position corresponding to the pressure on the diaphram 24. If it is desired to change the flow through conduit 4, the pressure on the diaphragm may be adjusted either manually through the device 38 or by any desired automatic control to vary the pressure on the diaphragm. Assuming that this pressure is increased, the diaphragm will be moved downwardly thereby moving the link 90 and pivot point 92 downwardly. Since the lever 74 is not moved, lever 76 will pivot about its left end and the spool 64 will be moved downwardly to connect pipe 62 with pipe 20. This will admit pressure to the upper end of cylinder 16 causing the piston 14 to move downwardly thereby opening the valve 6 further and at the same time moving the roller 44 downwardly. Due to the shape and pivot point of the cam 48, it will swing to the left under the influence of spring 72 thereby rocking the lever arms 66 and 74 counterclockwise. This action lowers the free end of arm 74 at the same time lowering the left end of lever 76 and rocking it about the pivot point 92 to raise the spool 64 to its closed or neutral position. The valve 6 has now taken a new position corresponding to the new setting of the controlling pressure and it will be apparent that for each value of the pressure in pipe 30, the valve will have a corresponding position in which the rate of flow through the conduit 4 is regulated proportionally to the controlling pressure.

It will be seen that the movement of the valve 6 in proportion to the controlling pressure varies with the shape of the cam 48. According to the present invention, the shape of this cam can readily be changed due to the thinness of the metal from which it is formed and to its manner of mounting. Thus the thin plate 48 can, if desired, be removed from the bar 52 and filed or cut to any desired configurations conveniently. The characteristic of the cam can also be changed readily by shifting the bracket 54 to change the pivot point of the cam relative to the roller 44.

While one embodiment of the invention has been shown and described in detail, it will be apparent that many changes might be made therein and it is not intended to limit the scope of the invention to the exact form shown nor otherwise than by the terms of the appended claims.

What is claimed is:

1. A regulator comprising a sensitive element responsive to a controlling pressure, a motor having an element movable in a line when the motor is operated, a cam follower connected to said last named element to be moved in a straight line, a cam pivoted at one end adjacent the line of movement of said follower and engageable with the follower, a stationary guide engaging said follower on the side opposite to that engaged by the cam, control means for the motor, and differential linkage connecting the control means to the sensitive element and the cam.

2. A regulator comprising a sensitive element responsive to a controlling pressure, a motor, a cam follower connected to the motor to be moved in a straight line thereby, an elongated cam engageable with said follower, a pivotal mounting for said cam adjustable toward and away from the line of movement of the follower to move the pivot point of the cam, thereby to change the characteristics of the cam, control means for the motor, and differential linkage connecting said control means to the sensitive element and the cam.

3. A regulator comprising a sensitive element responsive to a controlling pressure, a motor, a cam follower connected to the motor to be moved in a straight line thereby, a bar pivoted at one end lying beside the line of movement of said follower, a relatively thin plate secured at one edge to said bar and having its other edge engaging said follower, said other edge being adapted to be cut to follow any desired curve, a stationary guide engaging said follower on the side opposite that engaged by said plate control means for the motor, and differential linkage connecting said control means to the cam and the sensitive element.

4. In a regulator having a part moved lineally in accordance with the setting of the regulator, a cam comprising an elongated bar, a plate on which said bar is pivotally mounted at one end, adjustable mounting means for the plate for moving said pivotal mounting at right angles to its pivotal axis, and a relatively thin plate secured at one edge to said bar and having its other edge engageable with said part.

ALBERT J. ROSENBERGER.